J. MARKSON.
SWIVELING BRACKET FOR AUTOMOBILE LAMPS.
APPLICATION FILED OCT. 8, 1914.
1,162,091. Patented Nov. 30, 1915.
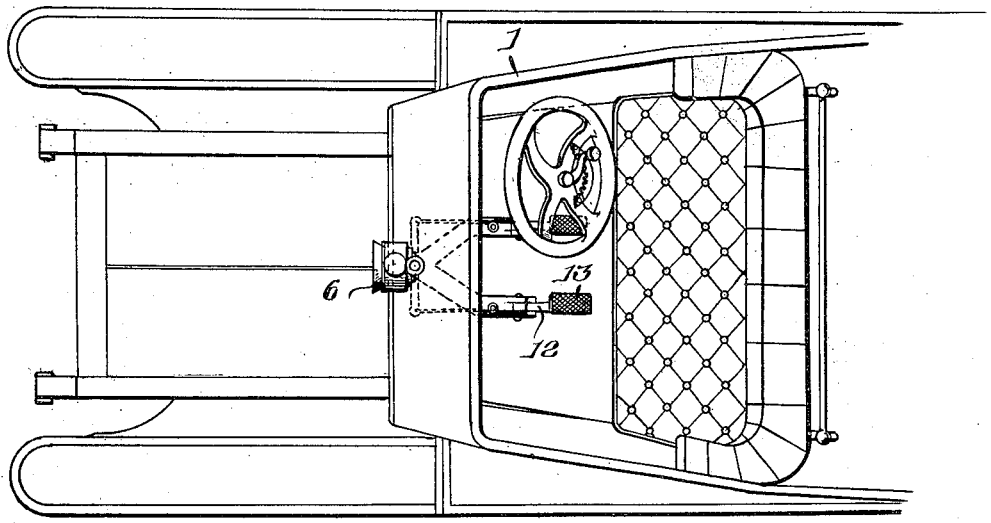
Fig. 1.
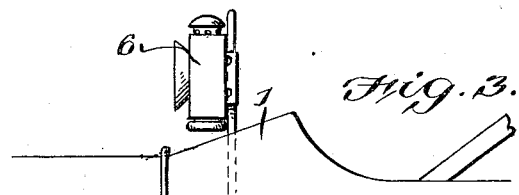
Fig. 2.
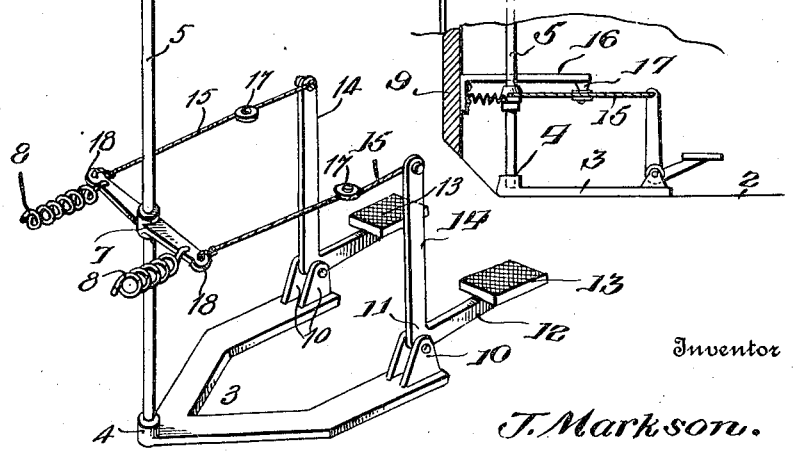
Witnesses
Jno Emirie
W. A. Williams
Inventor
J. Markson.
By
Attorney

UNITED STATES PATENT OFFICE.

JOSEPH MARKSON, OF TACOMA, WASHINGTON.

SWIVELING BRACKET FOR AUTOMOBILE-LAMPS.

1,162,091.  Specification of Letters Patent.  Patented Nov. 30, 1915.

Application filed October 8, 1914. Serial No. 865,737.

*To all whom it may concern:*

Be it known that I, JOSEPH MARKSON, citizen of the United States, residing at Tacoma, in the county of Pierce and State of Washington, have invented certain new and useful Improvements in Swiveling Brackets for Automobile-Lamps, of which the following is a specification.

This invention relates to swiveling brackets for automobile and other vehicle lamps or head lights and has as its object to provide a bracket for supporting such a lamp, and in connection with the bracket, means whereby the same may be turned from side to side so that the light from the lamp or head light may be directed to one side or the other of the path of travel of the vehicle to permit of the driver inspecting objects at the sides of the road, house members and branch roads without the necessity of stopping or alighting from the vehicle.

Another aim of the invention is to so construct the actuating mechanism for the bracket that the same may be operated without the necessity of releasing the steering wheel or the reins, if the device is employed on a delivery wagon or other horse drawn vehicle.

Another aim of the invention is to so construct the actuating mechanism that the same will be adapted to normally hold the head light in centered position, or, in other words, in position facing the direction of travel of the machine.

In the accompanying drawings: Figure 1 is a top plan view of the device embodying the present invention arranged within an automobile. Fig. 2 is a perspective view of the mechanism removed from the machine. Fig. 3 is a side elevation of the mechanism arranged within the machine.

Corresponding and like parts are referred to in the following description and indicated in all the views of the accompanying drawings by the same reference characters.

In the drawings, the numeral 1 indicates the cowl dash of the automobile and 2 the floor thereof. The device embodying the present invention includes a base 3 which is preferably substantially V-shaped, as shown in Fig. 2, although it may be of any desired form, and the base is provided at its front with a step bearing 4 in which is mounted the lower end of a rotatable standard 5 supporting at its upper end the head light 6 of the vehicle. It will be observed at this point that the said standard projects up through the cowl dash 1 and that the head light is located centrally in front of the said dash. Fixed upon the standard 5, near the lower end thereof, is a cross-head 7 to the arms of which are connected springs 8, which springs are connected also to the dash board 9 of the vehicle, and it will be understood that these springs, by reason of their equal pull upon the ends of the arms of the cross-head 7, serve to hold the standard 5 in centered position and with the head light facing in the direction of travel of the vehicle.

Means is provided, in connection with the cross-head 7 operable to turn the cross-head and thereby turn the head light from one side to the other and this means will now be described. Each arm of the base 3 is provided at its rear end with spaced upstanding ears 10 and between a pair of the ears is pivotally mounted an angle lever 11, an arm 12 of which projects rearwardly and is provided with a foot piece 13. The other arm 14 of each angle lever projects vertically or substantially vertically, and has connected to it one end of a chain, or other suitable flexible element 15. A bracket 16 is mounted upon the dash board 9 and supports pulleys 17 about which the flexible elements 15 are trained, the said elements being connected at their other ends to the ends of the arms of the cross-head, as indicated at 18. It will now be apparent that in the normal position of the parts the standard 5 will be so centered as to support the head-light facing in the direction of travel of the machine. Should it be desired, however, to turn the light toward one side or the other, the proper one of the foot pieces 13 is depressed, thereby rocking the corresponding arm 11 to exert a pull upon the corresponding flexible element 15 which will, of course, serve to turn the standard 5 in the proper direction and to an extent depending upon the distance to which the foot piece is depressed. Such movement will, of course, be against the tension of one of the springs 8 and, consequently, when the foot piece is relieved of pressure, these springs will serve to return the standard to centered position.

Having thus described the invention, what is claimed as new is:

The combination with a vehicle body, and a dash thereon, of a standard having its lower end rotatably mounted on the body in rear of the dash and its upper portion rotatably supported by the dash, a cross arm rigid with said standard above the lower end thereof, springs secured to the ends of said arm and to the dash in front of the same whereby to yieldably hold the standard in centered position, levers fulcrumed upon the body in rear of the standard, a bracket projecting rearwardly from the dash above the cross arm, pulleys on said bracket, and flexible connections between the levers and the cross arm passing around said pulleys whereby to move the arm and the standard in opposition to the springs.

In testimony whereof I affix my signature in presence of two witnesses.

JOSEPH MARKSON. [L. S.]

Witnesses:
W. G. HEINLY,
S. E. TAYLOR.